US 7,817,669 B2

(12) United States Patent
Pani et al.

(10) Patent No.: US 7,817,669 B2
(45) Date of Patent: Oct. 19, 2010

(54) METHOD AND APPARATUS FOR SUPPORTING RLC RE-SEGMENTATION

(75) Inventors: Diana Pani, Montreal (CA);
Christopher R. Cave, Montreal (CA);
Stephen E. Terry, Northport, NY (US);
Paul Marinier, Brossard (CA)

(73) Assignee: InterDigital Technology Corporation, Wilmington, DE (US)

( * ) Notice: Subject to any disclaimer, the term of this patent is extended or adjusted under 35 U.S.C. 154(b) by 337 days.

(21) Appl. No.: 12/023,547

(22) Filed: Jan. 31, 2008

(65) Prior Publication Data
US 2009/0290598 A1 Nov. 26, 2009

Related U.S. Application Data

(60) Provisional application No. 60/887,667, filed on Feb. 1, 2007.

(51) Int. Cl.
*H04J 3/24* (2006.01)
(52) U.S. Cl. .................... 370/474; 370/465; 370/476
(58) Field of Classification Search ............ 370/465, 370/466, 469, 470, 471, 472, 473, 474, 476, 370/389, 394
See application file for complete search history.

(56) References Cited

U.S. PATENT DOCUMENTS

| 6,724,777 | B1 | 4/2004 | Yamazaki et al. | |
|---|---|---|---|---|
| 7,054,270 | B2 * | 5/2006 | Yi et al. ................ | 370/232 |
| 7,130,295 | B2 * | 10/2006 | Kim et al. .............. | 370/349 |
| 2002/0048281 | A1 * | 4/2002 | Yi et al. ................ | 370/474 |
| 2003/0007480 | A1 * | 1/2003 | Kim et al. .............. | 370/349 |
| 2006/0251105 | A1 * | 11/2006 | Kim et al. .............. | 370/449 |

(Continued)

FOREIGN PATENT DOCUMENTS

WO 00/09511 2/2000

(Continued)

OTHER PUBLICATIONS

3rd Generation Partnership Project; Technical Specification Group Radio Access Network; HSPA Evolution (FDD); (Release 7); 3GPP TR 25.999 V1.0.0 (Nov. 2006).

(Continued)

*Primary Examiner*—Chi H. Pham
*Assistant Examiner*—Kevin Mew
(74) *Attorney, Agent, or Firm*—Volpe and Koenig, P.C.

(57) ABSTRACT

A method and apparatus for radio link control (RLC) re-segmentation are disclosed. An original RLC protocol data unit (PDU) is generated from at least one RLC service data unit (SDU). The RLC PDU size is within a flexible maximum RLC PDU size. The original RLC PDU is stored in a retransmission buffer. If transmission of the original RLC PDU fails and the original RLC PDU size is larger than an updated maximum RLC PDU size, the original RLC PDU is segmented to segmented RLC PDUs. If transmission of one of the segmented RLC PDUs fails, the original RLC PDU may be re-segmented to smaller size RLC PDUs, or the segmented RLC PDU may be sub-segmented. Alternatively, the failed RLC PDU may be processes as an RLC SDU to generate encapsulating RLC PDUs for carrying the RLC PDU. Alternatively, an RLC SDU corresponding to the failed RLC PDU may be re-segmented.

60 Claims, 2 Drawing Sheets

U.S. PATENT DOCUMENTS

| | | | |
|---|---|---|---|
| 2007/0091810 A1* | 4/2007 | Kim et al. | 370/236 |
| 2007/0110101 A1* | 5/2007 | Wu | 370/469 |
| 2007/0147315 A1* | 6/2007 | Khoury et al. | 370/338 |
| 2007/0253447 A1* | 11/2007 | Jiang | 370/474 |
| 2007/0291788 A1* | 12/2007 | Sammour et al. | 370/466 |
| 2008/0037588 A1* | 2/2008 | Yi | 370/474 |
| 2008/0101312 A1* | 5/2008 | Suzuki et al. | 370/342 |
| 2008/0130580 A1* | 6/2008 | Chaponniere et al. | 370/331 |
| 2008/0215948 A1* | 9/2008 | Pinheiro et al. | 714/748 |
| 2008/0219291 A1* | 9/2008 | Obuchi et al. | 370/469 |
| 2008/0293416 A1* | 11/2008 | Yi et al. | 455/436 |

FOREIGN PATENT DOCUMENTS

| | | |
|---|---|---|
| WO | 01/05121 | 1/2001 |
| WO | 2004/043017 | 5/2004 |
| WO | 2006/043746 | 4/2006 |

OTHER PUBLICATIONS

3$^{rd}$ Generation Partnership Project; Technical Specification Group Radio Access Network; High Speed Packet Access (HSPA) Evolution; Frequency Division Duplex (FDD) (Release 7); 3GPP TR 25.999 v7.0.1 (Dec. 2007).

3$^{rd}$ Generation Partnership Project; Technical Specification Group Radio Access Network; Radio Link Control (RLC) protocol specification (Release 7); 3GPP TS 25.322 V7.2.0 (Sep. 2006).

3$^{rd}$ Generation Partnership Project; Technical Specification Group Radio Access Network; Radio Link Control (RLC) protocol specification (Release 7); 3GPP TS 25.322 v7.5.0 (Dec. 2007).

3$^{rd}$ Generation Partnership Project; Technical Specification Group Radio Access Network; Radio Link Control (RLC) protocol specification (Release 8); 3GPP TS 25.322 V8.0.0 (Dec. 2007).

Samsung Electronics "HSPA + User Plane Enhancements", 3GPP TSG RAN WG2#56-bis, Sorrento, Italy, Jan. 15-19, 2007, R2-070125.

* cited by examiner

METHOD AND APPARATUS FOR SUPPORTING RLC RE-SEGMENTATION

CROSS REFERENCE TO RELATED APPLICATION

This application claims the benefit of U.S. provisional application No. 60/887,667 filed Feb. 1, 2007, which is incorporated by reference as if fully set forth.

FIELD OF INVENTION

The present invention is related to wireless communications.

BACKGROUND

Some of the goals of high speed packet access (HSPA) evolution include higher data rates, higher system capacity and coverage, enhanced support for packet services, reduced latency, reduced operator costs and backward compatibility. Meeting these goals requires evolutions to the radio interface protocol and network architecture. More specifically, meeting these goals has required a set of enhancements and architecture changes to layer 2 radio link control (RLC) and medium access control (MAC) functionalities.

In universal terrestrial radio access (UTRA) Release 6, an acknowledged mode (AM) RLC entity performs segmentation and concatenation of RLC service data units (SDUs) into fixed-size RLC packet data units (PDUs). The RLC PDU size is semi-static and can only be changed via higher layer signaling. The AM RLC entity is always re-established if the AM PDU size is changed by the higher layer. However, in the evolved HSPA architecture, in order to support high data rates, it has been proposed to have a flexible RLC PDU size that varies to reflect channel conditions. A flexible RLC PDU size increases RLC transmission and retransmission efficiency.

Flexible RLC PDU size will allow the radio network controller (RNC) to create RLC PDUs that closely reflect the channel conditions. A one-to-one mapping between an RLC PDU and a MAC PDU achieves the highest transmission efficiency. A bigger RLC PDU size may have a detrimental effect on the RLC transmission efficiency in bad channel conditions. Having a flexible PDU size would eliminate this problem since for the first RLC PDU transmission the size will reflect the current specified channel conditions, (i.e., max RLC PDU size).

However, when the RLC PDU size of the retransmission is larger than the current specified maximum RLC PDU size, a problem may occur for retransmission of the RLC PDU. If the channels conditions change dramatically the large RLC PDU may never be successfully transmitted. In addition, when a handover from Release 7 to Release 6 occurs, RLC PDUs created in Release 7 RLC might be larger than the new fixed RLC PDU size.

SUMMARY

A method and apparatus for RLC re-segmentation are disclosed. An original RLC PDU is generated from at least one RLC SDU. The RLC PDU size is within a flexible maximum RLC PDU size. The original RLC PDU is stored in a retransmission buffer, and transmitted. If transmission of the original RLC PDU fails and the original RLC PDU size is larger than an updated maximum RLC PDU size, the original RLC PDU is segmented to segmented RLC PDUs. If transmission of one of the segmented RLC PDUs fails, the original RLC PDU may be re-segmented to smaller size RLC PDUs, or the segmented RLC PDU may be sub-segmented. Alternatively, the failed RLC PDU may be processed as an RLC SDU to generate encapsulating RLC PDUs for carrying the RLC PDU. Alternatively, an RLC SDU corresponding to the failed RLC PDU may be re-segmented.

BRIEF DESCRIPTION OF THE DRAWINGS

A more detailed understanding may be had from the following description, given by way of example and to be understood in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

The following terminology will be used in this disclosure. An original RLC PDU means the first transmitted RLC PDU. A segmented RLC PDU means a first segmented RLC PDU of the original RLC PDU. A re-segmented RLC PDU means a second or later segmented RLC PDU of the original RLC PDU. Sub-segments mean segments of the segmented RLC PDU or re-segmented RLC PDU. The embodiments disclosed herein are applicable to both uplink (UL) and downlink (DL).

Figure 1:
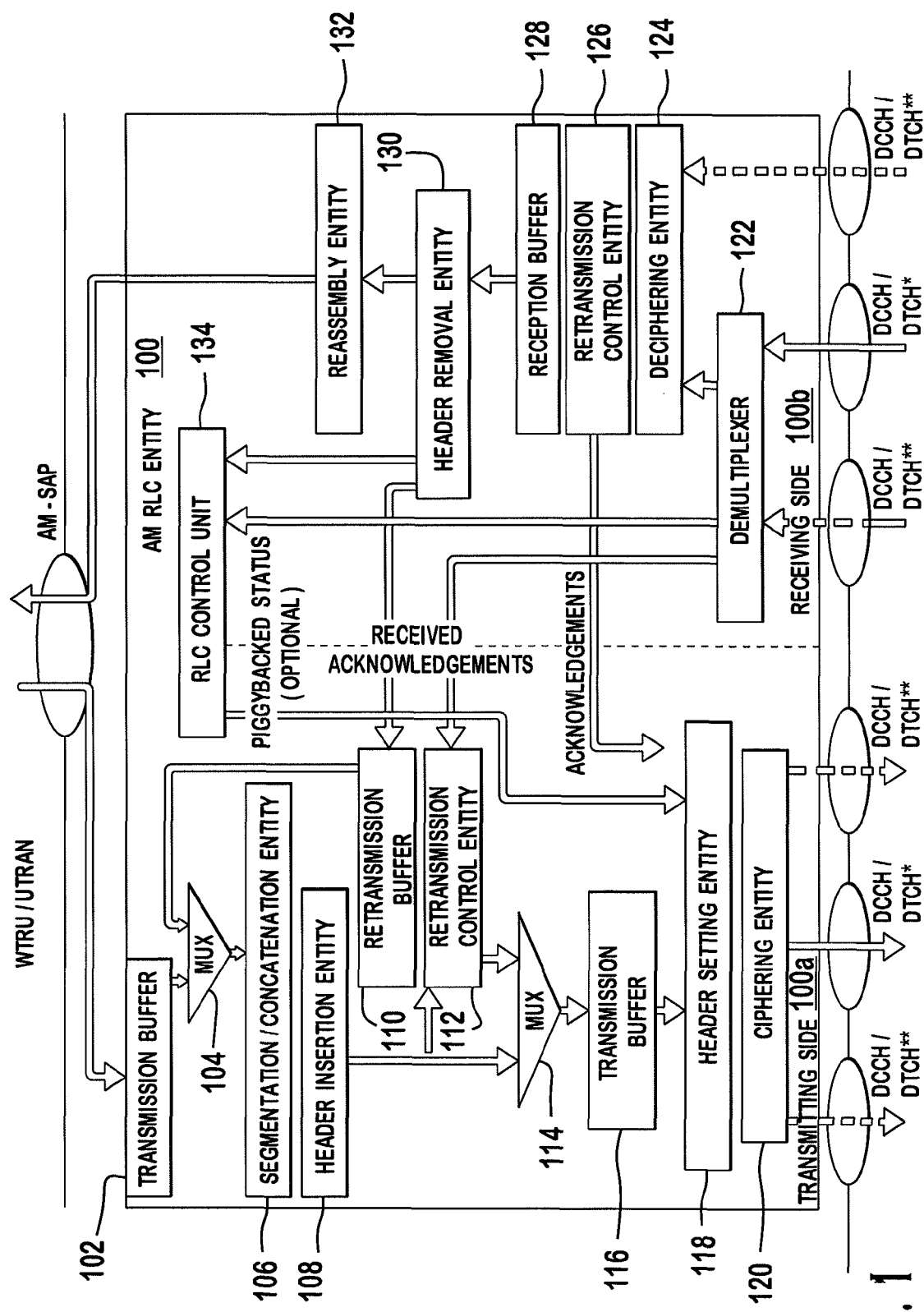
FIG. 1 is an example acknowledged mode (AM) RLC entity supporting RLC re-segmentation.

FIG. 1 is an example AM RLC entity 100 supporting RLC re-segmentation. The AM RLC entity 100 may be included in a WTRU or a network node, (e.g., a radio network controller (RNC) or Node-B, or any other network node). The AM RLC entity is configured for flexible RLC PDU size operation, where the AMD PDU size is variable between a minimum and maximum RLC PDU size. The maximum RLC PDU size used throughout this invention can be a semi-static parameter configured by a radio resource control (RRC) or a variable sized determined by the transmitter and adapted to radio conditions.

The AM RLC entity 100 includes a transmitting side 100a and a receiving side 100b. A peer AM RLC entity also includes a transmitting side and a receiving side. In the transmitting side 100a, the AM RLC entity 100 receives RLC SDUs from upper layers through an AM-service access point (SAP). The RLC SDUs may be stored in a transmission buffer 102 prior to segmentation and/or concatenation. The RLC SDUs are delivered to a segmentation/concatenation entity 106 via a multiplexer 104.

The RLC SDUs are segmented and/or concatenated by the segmentation/concatenation entity 106 into AMD PDUs of a flexible length as specified by an RRC entity or a Node-B. The segmentation and/or concatenation of RLC SDUs is performed as in conventional art. After segmentation and/or concatenation, an RLC PDU header is added by an RLC header insertion entity 108.

The RLC PDU is then sent to a transmission buffer 116 via a multiplexer 114. The RLC PDU is also stored in a retransmission buffer 110 for retransmission. The multiplexer 114 multiplexes RLC PDUs from the retransmission buffer 110 that need to be retransmitted and the newly generated RLC PDUs delivered from the segmentation/concatenation entity 106.

A retransmission control entity either 112 deletes or retransmits the RLC PDUs buffered in the retransmission buffer 110 based on the status report sent by a peer AM RLC entity. The status report may contain a positive acknowledgement (ACK) or a negative acknowledgement (NACK) of individual RLC PDUs received by the peer AM RLC entity. If a NACK is received for a particular RLC PDU, the retransmission control entity 112 may either retransmit the RLC PDU directly via the multiplexer 114, or may send the RLC PDU to the segmentation/concatenation entity 106 via the multiplexer 104 for re-segmentation of the RLC PDU. When the RLC PDU in the retransmission buffer 110 needs to be retransmitted, (i.e., a NACK is received), the retransmission control entity 112 determines whether the RLC PDU size is greater than the current (updated) maximum RLC PDU size at the time retransmission is necessary. The RLC PDU size may be simply compared to the maximum RLC PDU size. Alternatively, the retransmission control entity 112 may determine whether a difference of the RLC PDU size and the maximum RLC PDU size exceeds a threshold value, (i.e., (the RLC PDU size–the maximum RLC PDU size)>a threshold value). The retransmission control entity 112 may also determine whether the number of re-segmentation of the RLC PDU has exceeded a maximum allowed number.

If the RLC PDU size is not greater than the current maximum RLC PDU size, or the number of re-segmentation has exceeded the maximum allowed number, the RLC PDU stored in the retransmission buffer 110 is forwarded directly to the transmission buffer 116 for retransmission. If the RLC PDU size is greater than the current maximum RLC PDU size and the number of re-segmentation has not exceeded the maximum allowed number, the RLC PDU or the RLC SDU corresponding to the RLC PDU may re-segmented, which will be explained in detail below.

A header setting entity 118 completes the AMD PDU header of the RLC PDU stored in the transmission buffer 116. The AMD PDU header is completed based on the input from the RLC control unit 134 that indicates the values to set in various fields, (e.g., polling bit). The header setting entity 118 also multiplexes, if required, control PDUs received from the RLC control unit 134, (e.g., RESET and RESET ACK PDUs), and from a reception buffer 128, (e.g., piggybacked STATUS or STATUS PDUs), with RLC PDUs. The RLC PDU may be ciphered by a ciphering entity 120. The transmitting side 100a of the AM RLC entity 100 submits AMD PDUs to a lower layer through a logical channel, (e.g., dedicated control channel (DCCH) and dedicated traffic channel (DTCH)).

In the receiving side 100b, the AM RLC entity 100 receives the AMD PDUs through the configured logical channels from the lower layer. A received ACK is delivered to the retransmission control entity 112, and the AMD PDUs are routed to the deciphering entity 124 or to the RLC control unit 134 via the demultiplexer 122. The RLC PDUs are deciphered by the deciphering entity 124 (if ciphering is configured), and then delivered to the reception buffer 128.

The AMD PDUs are placed in the reception buffer 128 until a complete RLC SDU has been received. The retransmission control entity 126 in the receiving side 100b of the RLC entity 100 acknowledges successful reception of an AMD PDU, or requests retransmission of a missing AMD PDU by sending a STATUS PDU to the transmitting side. An RLC header is removed by an RLC header removal entity 130. If a piggybacked STATUS PDU is found in the received AMD PDU, it is delivered to the retransmission control entity 112 of the transmitting side 100a of the AM RLC entity 100 to purge the retransmission buffer 110 of positively acknowledged AMD PDUs, and to indicate which AMD PDUs need to be retransmitted. Once a complete RLC SDU has been received, the associated AMD PDUs are reassembled by the reassembly entity 132 and delivered to upper layers through the AM-SAP.

The receiving side 100b of the RLC entity 100 may reassemble segmented RLC SDUs or (re)segmented RLC PDUs, and report status of the segmented RLC SDUs or (re)segmented RLC PDUs to the peer RLC entity.

Re-segmentation of RLC PDU or RLC SDU and header formats are explained hereinafter.

In accordance with a first embodiment, the RLC PDU stored in the retransmission buffer 110 is re-segmented to fit into the new maximum RLC PDU size. An original RLC PDU is stored in the retransmission buffer 110 at the time of initial transmission. If the original RLC PDU is not successfully transmitted, the original RLC PDU is retransmitted. If, due to the change of the maximum RLC PDU size, the original RLC PDU size is greater than the current maximum RLC PDU size (and optionally the number of re-segmentation has not exceeded the maximum allowed number), the original RLC PDU is delivered to the segmentation/concatenation entity 106 and segmented into smaller size segmented RLC PDUs. The segmented RLC PDUs are stored in the retransmission buffer 110.

To support segmentation of the original RLC PDU, additional header information may be included in the segmented RLC PDU. The sequence number (SN) of the original RLC PDU is reused for all segmented RLC PDUs. The header information of the original RLC PDU has to be included at least in one of the segmented RLC PDUs. A segmentation field indicating the segmented RLC PDUs may be included, (e.g., two or three bits to indicate up to 4 or 8 segments). A field indicating the last segment of the original RLC PDU may be included. Alternatively, a field indicating the number of segments of the RLC PDU may be included.

In addition, an indication that the current packet is a segmented RLC PDU may be included. Several options are possible for this indication. A currently reserved bit sequence of the header extension (HE) field in the conventional RLC header may be used. For instance, the sequence "11" is currently reserved. The sequence "110" may be used to indicate that the PDU is a segmented RLC PDU, while the sequence "111" is reserved for future use. Alternatively, a special bit sequence may be used for the length indicator, followed by the flag for the last segment. Alternatively, a 1 bit field (segmentation flag) may be added to the RLC header for the new version of the RLC protocol for this purpose (this field may be present in every RLC PDU).

The first embodiment may be applied to re-segmentation of the original RLC PDU and sub-segmentation of the segmented RLC PDU. When the segmented RLC PDU needs to be retransmitted and the segmented RLC PDU size is greater than the current maximum RLC PDU size, the segmented RLC PDU may be further re-segmented, (i.e., sub-segmentation). All sub-segments are stored in the retransmission buffer and are discarded when an ACK for each sub-segment is received from the peer RLC entity.

To support re-segmentation of the segmented RLC PDUs, the following information may be added to the header of the sub-segments.

Sub-segment information. Sub-segment information describes the segment such that the receiving entity can reconstruct to the segment or original PDU. This information may include any of the following: total number of segments (or sub-segments), segment number (or sub-segment number), segment size (or sub-segment size), segment (or sub-segment) start byte (indicating the position of the first byte of the segment of the segmented packet or original PDU), segment (or sub-segment) last byte (indicating the position of the last byte of the segment of the segmented packet or original PDU), etc. A limit to the amount of times re-segmentation is performed may be configured;

An indication that the packet is a sub-segment, (e.g., a bit appended to the RLC PDU segment indication); and A field indicating the number of sub-segments.

If the segmented RLC PDU size exceeds the current maximum RLC PDU size, the original RLC PDU may be segmented once again in a different RLC PDU size, (i.e., re-segmentation), instead of sub-segmenting the segmented RLC PDU. The re-segmented RLC PDUs are stored in the retransmission buffer 110 for retransmission. The segmented RLC PDU or segments of the first or previous segmentation are discarded from the retransmission buffer 110. For re-segmentation purpose, the original RLC PDU may be maintained in the retransmission buffer. To support this scheme, a version indicator is added to the header information of the re-segmented RLC PDU to indicate the segmentation version of the RLC PDU, (i.e., the number that the RLC PDU has been segmented). Every time the original RLC PDU is segmented or re-segmented, the version indicator is incremented by one. A limit to the number of segmentation may be configured (depending on the number of bits allocated for the version indicator, 1 or 2 bits may be used).

Figure 2:
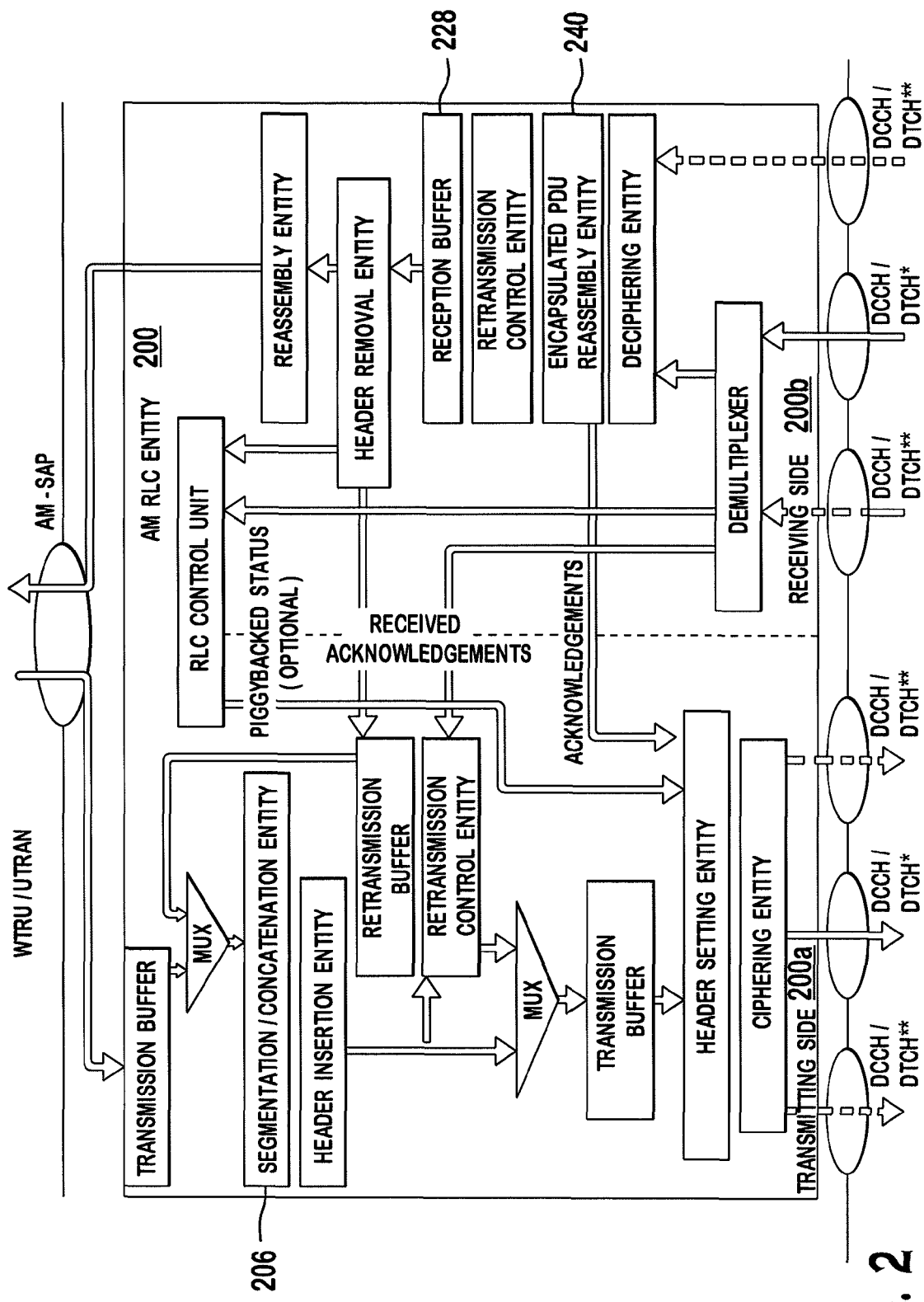
FIG. 2 is an example AM RLC entity supporting RLC re-segmentation in accordance with the second embodiment.

FIG. 2 is an example AM RLC entity 200 supporting RLC re-segmentation in accordance with the second embodiment. In accordance with a second embodiment, a negatively acknowledged RLC PDU at the time the maximum RLC PDU size is reduced in the retransmission buffer 210 is moved to the segmentation/concatenation entity 206 and processed as a new RLC SDU. The negatively acknowledged RLC PDU is processed in the same way as normal RLC SDUs, (i.e., segmented and/or concatenated), except for an indication in the header. The encapsulated PDUs resulting from this scheme are assigned normal sequence numbers, (i.e., following the same sequence as other RLC PDUs). Preferably, only negatively acknowledged PDUs whose length is higher than the current maximum RLC PDU size are encapsulated.

The AM RLC entity 200 is substantially the same as the AM RLC entity 100, except an encapsulated PDU reassembly entity 240. The receiving side 200b of the AM RLC entity 200 places the received encapsulated PDUs in a separate reassembly buffer (not shown) instead of placing them in the normal reception buffer 228. The encapsulated PDU reassembly entity 240 reassembles the encapsulated PDUs. When reassembly of the encapsulated PDUs are complete, the underlying PDU, (i.e., the negatively acknowledged RLC PDU), is moved into the reception buffer 228 and successful reassembly is indicated to the transmitting side 200a of the AM RLC entity 200 for acknowledgement of the underlying RLC PDU sequence number.

In order to unambiguously indicate the first and last PDUs encapsulating the negatively acknowledged RLC PDU, the transmitting side 200a of the AM RLC entity 200 may be constrained to use consecutive sequence numbers for the encapsulating PDUs, and indicate the last encapsulating PDU with a flag, (e.g., one bit), to allow the receiving side of the peer AM RLC entity to determine at which point reassembly can be completed.

The header information for the encapsulating RLC PDU is same to the conventional RLC header except that an indication is added to indicate whether the incoming PDU is a normal RLC PDU or an encapsulating RLC PDU. Several options are possible for this indication. A currently reserved bit sequence for the HE field in the RLC header may be used. For instance, the sequence "11" is currently reserved. The sequence "110" may be used to indicate that the PDU encapsulates a segment of a previously negatively acknowledged RLC PDU, while the sequence "111" is reserved for future use. An additional bit after the sequence may indicate whether the PDU contains the last segment of the encapsulated PDU. A special bit sequence may be used for the length indicator, followed by the flag for the last segment. A 1 bit field (encapsulation flag) may be added in the header for the new version of the RLC protocol for this purpose, (this field may be present in every RLC PDU), followed by a flag for the last segment for these PDUs which have the encapsulation flag set.

In accordance with a third embodiment, if the RLC PDU size is greater than the maximum RLC PDU size when an RLC PDU needs to be retransmitted, the AM RLC entity 100 may re-segment the RLC SDU corresponding to that RLC PDU. One extra field is added to the RLC header to indicate version of RLC SDU segmentation. The new RLC PDUs are stored in the retransmission buffer 110. RLC PDUs corresponding to older versions of the RLC SDU are discarded.

In addition, if the original RLC PDU contains several RLC SDUs and/or segments of RLC SDUs, and the original RLC PDU is larger than the maximum RLC PDU, the RLC PDU may be assembled differently. The SDUs contained in the original RLC PDU may be combined and/or segmented differently to fit into the new maximum RLC PDU size. This scheme may not support RLC PDU SN reuse. Therefore, new SDU sequence numbers or packet data convergence protocol (PDCP) SN re-use may be applied.

The receiving side 100b of the RLC entity 100 is responsible for reporting status information of AMD PDUs. The status reports may vary depending on which segmentation scheme is used. The status report may be triggered as in the prior art. The number of retransmission and discard timers may be directly related to the original RLC PDU, or may be independent for each segment, or a combination of the two. Optionally, a maximum RLC PDU size change may trigger the RLC receiver to send a status report to the RLC transmitter.

A status report may be sent on a segmented RLC PDU basis, (i.e., segment level based status), if the original RLC PDU has been segmented. The status report may include an SN, a segment information, (i.e., number), and/or a sub-segment information, (i.e., number). If all segments are successfully received, the status report may include only the SN, and the peer RLC entity may deduce that all segments corresponding to that SN are successfully received and discard all segments corresponding to the SN in the retransmission buffer.

Alternatively, a status report may be sent once all segments of the original RLC PDU have been received successfully. The status report is sent on an RLC PDU basis, (i.e., no segment information), as conventionally done, (i.e., sequence number is indicated in the status report). If the RLC receiver detects that a segmented RLC PDU has been received with an updated version indicator, the RLC receiver may discard all successful RLC PDUs which contain an older version indicator.

In status reporting of re-segmented RLC SDUs, the status report may be RLC SDU-based or RLC PDU-based. If the RLC receiver detects that a different version of the RLC PDU has been received with an updated version indicator, the RLC receiver may discard all successful RLC PDUs which contain an older version indicator.

Although the features and elements are described in embodiments in particular combinations, each feature or element can be used alone without the other features and elements of the embodiments or in various combinations with or without other features and elements. The methods or flow charts provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for radio link control (RLC) re-segmentation, the method comprising:
    generating an original RLC protocol data unit (PDU) from at least one RLC service data unit (SDU), an RLC PDU size being within a minimum and maximum RLC PDU size;
    storing the original RLC PDU in a retransmission buffer;
    transmitting the original RLC PDU;
    if transmission of the original RLC PDU fails and the original RLC PDU size is larger than an updated maximum RLC PDU size at the time of retransmission of the original RLC PDU, segmenting the original RLC PDU to segmented RLC PDUs;
    storing the segmented RLC PDUs in the retransmission buffer; and
    transmitting the segmented RLC PDUs.

2. The method of claim 1 wherein the original RLC PDU is segmented if the number of re-segmentation has not exceeded a maximum allowed number.

3. The method of claim 1 wherein a sequence number (SN) of the original RLC PDU is included in an RLC header of all segmented RLC PDUs.

4. The method of claim 3 wherein header information of the original RLC PDU is included in at least one of the segmented RLC PDUs.

5. The method of claim 3 wherein a segmentation field indicating the segmented RLC PDUs is included in the RLC header of the segmented RLC PDUs.

6. The method of claim 3 wherein a field indicating if the segmented RLC PDU is the last segment of the original RLC PDU is included in the RLC header of the segmented RLC PDUs.

7. The method of claim 3 wherein a field indicating the number of segments of the RLC PDU is included in the RLC header of the segmented RLC PDUs.

8. The method of claim 3 wherein an indication that the packet is a segmented RLC PDU is included in the RLC header of the segmented RLC PDUs.

9. The method of claim 8 wherein the indication is given by using a bit sequence of header extension (HE) field in the RLC header.

10. The method of claim 8 wherein the indication is given by using a special bit sequence for a length indicator.

11. The method of claim 8 wherein the indication is given by using a segmentation flag in the RLC header.

12. The method of claim 1 further comprising:
    if transmission of one of the segmented RLC PDUs fails and the failed segmented RLC PDU size is larger than an updated maximum RLC PDU size at the time of retransmission of the segmented RLC PDU, re-segmenting the original RLC PDU to smaller size re-segmented RLC PDUs;
    storing the re-segmented RLC PDUs in the retransmission buffer; and
    transmitting the re-segmented RLC PDUs.

13. The method of claim 12 wherein a version indicator is added to an RLC header of the re-segmented RLC PDUs.

14. The method of claim 1 further comprising:
    if transmission of one of the segmented RLC PDUs fails and the failed segmented RLC PDU size is larger than an updated maximum RLC PDU size at the time of retransmission of the failed segmented RLC PDU, sub-segmenting the failed segmented RLC PDU to sub-segments;
    storing the sub-segments in the retransmission buffer; and
    transmitting the sub-segments.

15. The method of claim 14 wherein an indication that a packet is a sub-segment and a field indicating the number of sub-segments are included in the sub-segments.

16. A method for radio link control (RLC) re-segmentation, the method comprising:
    generating an RLC protocol data unit (PDU) from at least one RLC service data unit (SDU), an RLC PDU size being within a minimum and maximum RLC PDU size;
    storing the RLC PDU in a retransmission buffer;
    sending the RLC PDU;
    if transmission of the RLC PDU fails and the RLC PDU size is larger than an updated maximum RLC PDU size at the time of retransmission of the RLC PDU, processing the RLC PDU as an RLC SDU to generate at least two encapsulating RLC PDUs for carrying the RLC PDU; and
    sending the encapsulating RLC PDUs.

17. The method of claim 16 wherein consecutive sequence numbers are used for the encapsulating PDUs, and the last encapsulating PDU is indicated with a flag.

18. The method of claim 16 wherein the encapsulating RLC PDUs include an indication that an incoming packet is an encapsulating RLC PDU.

19. The method of claim 18 wherein the indication is given by using a bit sequence of header extension (HE) field in an RLC header.

20. The method of claim 18 wherein the indication is given by using a special bit sequence for a length indicator.

21. The method of claim 18 wherein the indication is given by using a segmentation flag in the RLC header.

22. A method for radio link control (RLC) re-segmentation, the method comprising:
generating an original RLC protocol data unit (PDU) from at least one RLC service data unit (SDU), a size of the original RLC PDU being within a minimum and maximum RLC PDU size;
sending the original RLC PDU;
if transmission of the original RLC PDU fails and the size of the original RLC PDU is larger than an updated maximum RLC PDU size at the time of retransmission of the original RLC PDU, re-processing said at least one RLC SDU to generate a set of second RLC PDUs; and
sending the set of second RLC PDUs.

23. The method of claim 22 wherein a field is added to an RLC header of the set of second RLC PDUs to indicate a version of RLC SDU segmentation.

24. The method of claim 22 wherein if at least two RLC SDUs are included in the original RLC PDU, the RLC SDUs are arranged differently to generate the set of second RLC PDUs.

25. A method for radio link control (RLC) re-segmentation, the method comprising:
receiving segmented RLC protocol data units (PDUs) of an original RLC PDU from a peer RLC entity, an RLC PDU size being within a minimum and maximum RLC PDU size, and the original RLC PDU being segmented on a condition that the original RLC PDU size is larger than the maximum RLC PDU size; and
sending a status report to the peer RLC entity, the status report indicating a positive acknowledgement (ACK) or a negative acknowledgement (NACK) for the segmented RLC PDUs.

26. The method of claim 25 wherein the status report is generated on a segmented RLC PDU basis.

27. The method of claim 26 wherein the status report includes at least one of a sequence number (SN) of the original RLC PDU and segment information of the segmented RLC PDUs.

28. The method of claim 26 wherein if all segmented RLC PDUs are successfully received, the status report includes only a sequence number (SN) of the original RLC PDU.

29. The method of claim 25 wherein the status report is triggered when a maximum RLC PDU size changes.

30. The method of claim 25 wherein the status report is sent once all segmented RLC PDU of the original RLC PDU have been received successfully.

31. An apparatus for radio link control (RLC) re-segmentation, the apparatus comprising:
a segmentation/concatenation entity for generating an original RLC protocol data unit (PDU) from at least one RLC service data unit (SDU), the original RLC PDU size being within a minimum and maximum RLC PDU size;
a retransmission control entity for forwarding the original RLC PDU to the segmentation/concatenation entity to segment the original RLC PDU to segmented RLC PDUs if transmission of the original RLC PDU fails and the original RLC PDU size is larger than an updated maximum RLC PDU size at the time of retransmission of the original RLC PDU;
a retransmission buffer for storing the original RLC PDU and the segmented RLC PDUs; and
a transceiver for transmitting the original RLC PDU and the segmented RLC PDUs.

32. The apparatus of claim 31 wherein the original RLC PDU is segmented if the number of re-segmentation has not exceeded a maximum allowed number.

33. The apparatus of claim 31 wherein a sequence number (SN) of the original RLC PDU is included in an RLC header of all segmented RLC PDUs.

34. The apparatus of claim 33 wherein header information of the original RLC PDU is included in at least one of the segmented RLC PDUs.

35. The apparatus of claim 33 wherein a segmentation field indicating the segmented RLC PDUs is included in the RLC header of the segmented RLC PDUs.

36. The apparatus of claim 33 wherein a field indicating the last segment of the original RLC PDU is included in the RLC header.

37. The apparatus of claim 33 wherein a field indicating the number of segments of the RLC PDU is included in the RLC header of the segmented RLC PDUs.

38. The apparatus of claim 33 wherein an indication that the packet is a segmented RLC PDU is included in the RLC header of the segmented RLC PDUs.

39. The apparatus of claim 38 wherein the indication is given by using a bit sequence of header extension (HE) field in the RLC header.

40. The apparatus of claim 38 wherein the indication is given by using a special bit sequence for a length indicator.

41. The apparatus of claim 38 wherein the indication is given by using a segmentation flag in the RLC header.

42. The apparatus of claim 31 wherein if transmission of one of the segmented RLC PDUs fails and the failed segmented RLC PDU size is larger than an updated maximum RLC PDU size at the time of retransmission of the segmented RLC PDU, the retransmission control entity re-segments the original RLC PDU to smaller size re-segmented RLC PDUs, and the re-segmented RLC PDUs are transmitted.

43. The apparatus of claim 42 wherein a version indicator is added to an RLC header of the re-segmented RLC PDUs.

44. The apparatus of claim 31 wherein if transmission of one of the segmented RLC PDUs fails and the failed segmented RLC PDU size is larger than an updated maximum RLC PDU size at the time of retransmission of the failed segmented RLC PDU, the retransmission control entity sub-segments the failed segmented RLC PDU to sub-segments, and the sub-segments are transmitted.

45. The apparatus of claim 44 wherein an indication that a packet is a sub-segment and a field indicating the number of sub-segments are included in the sub-segments.

46. An apparatus for radio link control (RLC) re-segmentation, the apparatus comprising:
a segmentation/concatenation entity for generating an RLC protocol data unit (PDU) from at least one RLC service data unit (SDU), an RLC PDU size being within a minimum and maximum RLC PDU size;
a retransmission control entity for forwarding the RLC PDU to the segmentation/concatenation entity to process the RLC PDU as an RLC SDU to generate at least two encapsulating RLC PDUs for carrying the RLC PDU if transmission of the RLC PDU fails and the RLC PDU size is larger than an updated maximum RLC PDU size at the time of retransmission of the RLC PDU;

a retransmission buffer for storing the RLC PDU and the encapsulating RLC PDUs; and a transceiver for transmitting the RLC PDU and the encapsulating RLC PDUs.

47. The apparatus of claim 46 wherein consecutive sequence numbers are used for the encapsulating PDUs, and the last encapsulating PDU is indicated with a flag.

48. The apparatus of claim 46 wherein the encapsulating RLC PDUs include an indication that an incoming packet is an encapsulating RLC PDU.

49. The apparatus of claim 48 wherein the indication is given by using a bit sequence of header extension (HE) field in an RLC header.

50. The apparatus of claim 48 wherein the indication is given by using a special bit sequence for a length indicator.

51. The apparatus of claim 48 wherein the indication is given by using a segmentation flag in an RLC header.

52. An apparatus for radio link control (RLC) re-segmentation, the apparatus comprising:

a transmission buffer for storing RLC service data units (SDUs);

a segmentation/concatenation entity for generating an original RLC protocol data unit (PDU) from at least one RLC SDU, a size of the original RLC PDU being within a minimum and maximum RLC PDU size;

a retransmission control entity for re-processing said at least one RLC SDU to generate a set of second RLC PDUs if transmission of the original RLC PDU fails and the size of the original RLC PDU is larger than an updated maximum RLC PDU size at the time of retransmission of the original RLC PDU; and a transceiver for sending the original RLC PDU and the set of second RLC PDUs.

53. The apparatus of claim 52 wherein a field is added to an RLC header of the set of RLC PDUs to indicate a version of RLC SDU segmentation.

54. The apparatus of claim 52 wherein if at least two RLC SDUs are included in the original RLC PDU, the RLC SDUs are arranged differently to generate the set of RLC PDUs.

55. An apparatus for radio link control (RLC) re-segmentation, the apparatus comprising:

a transceiver for receiving segmented RLC protocol data units (PDUs) of an original RLC PDU from a peer RLC entity, an RLC PDU size being within a minimum and maximum RLC PDU size, and the original RLC PDU being segmented on a condition that the original RLC PDU size is larger than the maximum RLC PDU size; and a retransmission control entity for sending a status report to the peer RLC entity, the status report indicating a positive acknowledgement (ACK) or a negative acknowledgement (NACK) for the segmented RLC PDUs.

56. The apparatus of claim 55 wherein the status report is generated on a segmented RLC PDU basis.

57. The apparatus of claim 56 wherein the status report includes a sequence number (SN) of the original RLC PDU and a segment number of the segmented RLC PDUs.

58. The apparatus of claim 56 wherein if all segmented RLC PDUs are successfully received, the status report includes only a sequence number (SN) of the original RLC PDU.

59. The apparatus of claim 55 wherein the status report is triggered when a maximum RLC PDU size changes.

60. The apparatus of claim 55 wherein the status report is sent once all segmented RLC PDU of the original RLC PDU have been received successfully.

* * * * *